United States Patent
Miyasaka

(10) Patent No.: US 6,866,115 B2
(45) Date of Patent: Mar. 15, 2005

(54) FRONT BODY STRUCTURE FOR VEHICLE

(75) Inventor: Hiroyuki Miyasaka, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/240,547

(22) PCT Filed: Jan. 18, 2002

(86) PCT No.: PCT/JP02/00319
§ 371 (c)(1),
(2), (4) Date: Oct. 2, 2002

(87) PCT Pub. No.: WO02/068256
PCT Pub. Date: Sep. 6, 2002

(65) Prior Publication Data
US 2003/0141712 A1 Jul. 31, 2003

(30) Foreign Application Priority Data
Feb. 27, 2001  (JP) .......................... 2001-52736

(51) Int. Cl.[7] .............................................. B62D 21/15
(52) U.S. Cl. .................... 180/311; 280/784; 296/187.09
(58) Field of Search .............................. 280/770, 784; 180/311; 296/187.03, 187.09, 187.1, 187.12

(56) References Cited

U.S. PATENT DOCUMENTS

| | | | | |
|---|---|---|---|---|
| 3,881,742 A | * | 5/1975 | Felzer | 280/784 |
| 5,275,436 A | * | 1/1994 | Pomero | 280/784 |
| 5,685,599 A | * | 11/1997 | Kitagawa | 296/204 |
| 6,027,159 A | * | 2/2000 | Baumann | 296/187.03 |
| 6,102,472 A | | 8/2000 | Wallström | 296/203.01 |
| 6,209,948 B1 | * | 4/2001 | Mori et al. | 296/187.09 |
| 6,296,298 B1 | | 10/2001 | Barz | 296/187.02 |
| 6,511,119 B2 | * | 1/2003 | Takase et al. | 296/187.09 |
| 6,601,873 B1 | * | 8/2003 | Bartesch et al. | 280/784 |
| 2002/0008375 A1 | * | 1/2002 | Iyanagi et al. | 280/784 |

FOREIGN PATENT DOCUMENTS

| | | |
|---|---|---|
| DE | 10028704 A1 | 12/2001 |
| EP | 0921051 A2 | 6/1999 |
| EP | 0980815 A1 | 2/2000 |
| EP | 1138580 A2 | 10/2001 |
| JP | 11-342869 | 12/1999 |
| JP | 2001-287670 | 10/2001 |

\* cited by examiner

*Primary Examiner*—Paul N. Dickson
*Assistant Examiner*—Laura B. Rosenberg
(74) *Attorney, Agent, or Firm*—McDermott Will & Emery LLP

(57) ABSTRACT

A front body structure is provided to restrain a collision load, which has been applied on a front wheel by a vehicle front collision, to be concentrated on a front end of a side sill excessively. In the structure, a front energy absorbing member 23 is attached to a back face of a lateral end of a bumper 21. A recess 18 is formed by a front end of the side sill 7 and a front face of an outrigger 15. A rear energy absorbing member 19 is attached into the recess 18. The outrigger 15 connects the side sill 7 with a front side member extension 5 joined to the rear end of a front side member 3. At the vehicle front collision, the front energy absorbing member 23 interferes with the right-and-front part of the front wheel 1 to allow the left-and-front part of the front wheel 1 to interfere with the side face of the front side member 3 and also allow the rear part of the wheel 1 to interfere with the rear energy absorbing member 19.

23 Claims, 14 Drawing Sheets

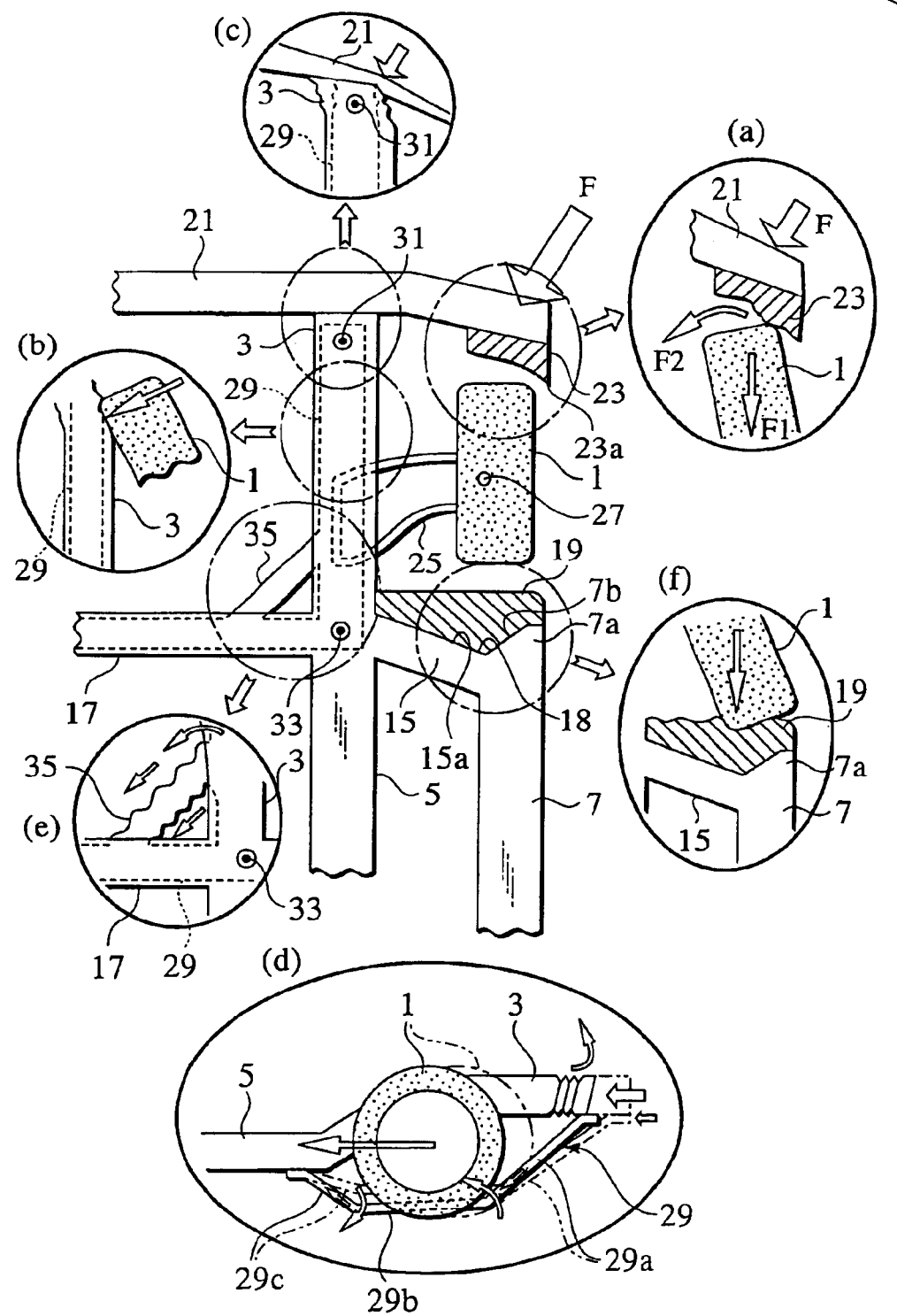

FRONT BODY STRUCTURE FOR VEHICLE

TECHNICAL FIELD

The present invention relates to a front body structure for vehicle.

BACKGROUND ART

Japanese Patent Publication (kokai) No. 11-342869 discloses a front body structure for vehicle. This front body structure includes a pair of side sills arranged on both sides of a lower part of a vehicle body to extend in the vehicle's fore-and-aft direction. Further, a front pillar is arranged to stand on a front end of each side sill. The front body structure is adapted so as to disperse a collision load, which has been transmitted through the front wheel at the vehicle front collision, by the side sill itself.

In the above-mentioned front body structure, however, there is a tendency that when the vehicle has a front collision, at least one front wheel interferes with only the front end of the side sill directly, so that a collision load is concentrated on the side sill excessively, causing its great deformation. Additionally, when the front wheel is steered inwardly in the vehicle's width direction since the vehicle has a collision from oblique forward, a problem arises in that the front wheel cannot always interfere with any vehicle-body structural member disposed inside the front wheel, for example, a side member. Such a subject is caused since the above front body structure is not controlled a traverse of the front wheel(s) subsequent to the vehicle collision.

DISCLOSURE OF INVENTION

Under the above circumstance, it is an object of the present invention to provide a front body structure which is capable of avoiding a concentration of a collision load, which has been exerted to a front wheel (or front wheels) by the vehicle front collision, on the front end of the side sill.

According to the present invention, the above-mentioned object is accomplished by a front body structure for vehicle, comprising;

a front wheel arranged in each side of the vehicle;

a vehicle-body structural member arranged at least behind the front wheel in a vehicle's fore-and-aft direction or inside the front wheels in a vehicle's width direction; and a front-wheel traverse controller provided on the vehicle-body structural member, for controlling the traverse of the front wheel at a vehicle front collision and transmitting a collision load from the front wheel to the vehicle-body structural member.

BRIEF DESCRIPTION OF DRAWINGS

FIG. 5 is an explanatory diagram showing the traverse of a front wheel and the deformation of respective parts of the vehicle body at the collision of FIG. 4, also showing their sequential changes with diagram parts (a) to (f);

FIGS. 6A and 6B are explanatory diagrams of the structure at the collision of FIG. 4, viewed from the vehicle lateral side, in which FIG. 6A shows a condition before the collision and FIG. 6B shows a condition after the collision;

FIGS. 8A and 8B are explanatory diagrams of the structure at the collision of FIG. 7, viewed from the vehicle lateral side, in which FIG. 8A shows a condition before the collision and FIG. 8B shows a condition after the collision;

FIGS. 10A and 10B are sectional views taken along a line X—X of a front pillar of FIG. 6A, showing the second embodiment of the invention, in which FIG. 10A shows a condition before the collision and FIG. 10B shows a condition after the collision;

FIGS. 11A and 11B are sectional views taken along the line X—X of the front pillar of FIG. 6A, showing the third embodiment of the invention, in which FIG. 11A shows a condition before the collision and FIG. 11B shows a condition after the collision;

FIGS. 12A and 12B are explanatory diagrams of the structure in accordance with the fourth embodiment, viewed from the vehicle lateral side, in which FIG. 12A shows a condition before the collision and FIG. 12B shows a condition after the collision;

FIGS. 13A and 13B are plan views of the front structure showing the fifth embodiment, in which FIG. 13A shows a condition before the collision and FIG. 13B shows a condition after the collision;

FIGS. 16A and 16B are sectional views taken along a line XVI—XVI of the front pillar of FIG. 6A, showing the eighth embodiment of the invention, in which FIG. 16A shows a condition before the collision and FIG. 16B shows a condition after the collision.

BEST MODE FOR CARRYING OUT THE INVENTION

Referring to accompanying drawings, embodiments of the present invention will be described below.

Figure 1:
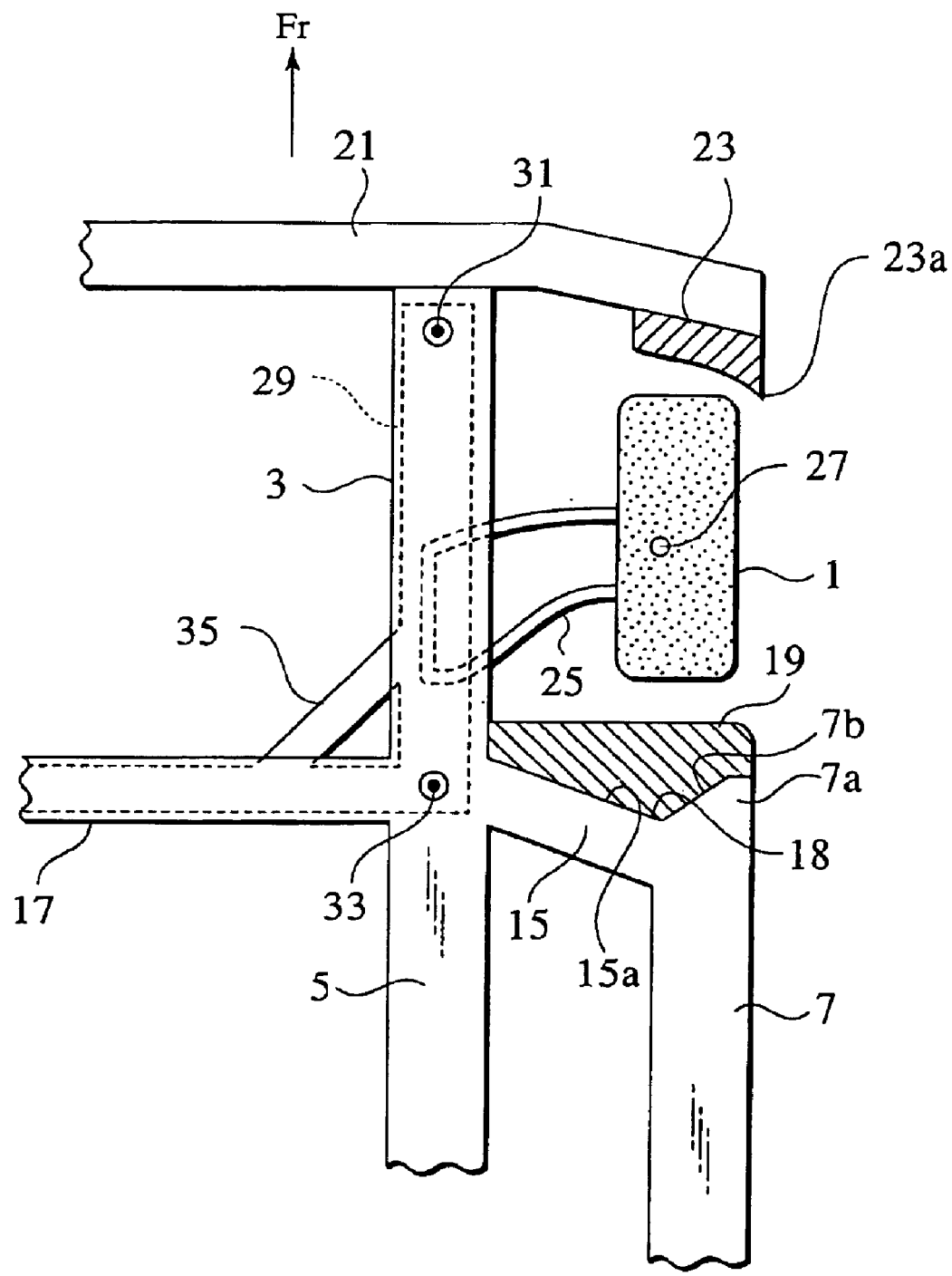
FIG. 1 is a plan view of a front structure for automotive body, in accordance with the first embodiment of the present invention.
Figure 2:
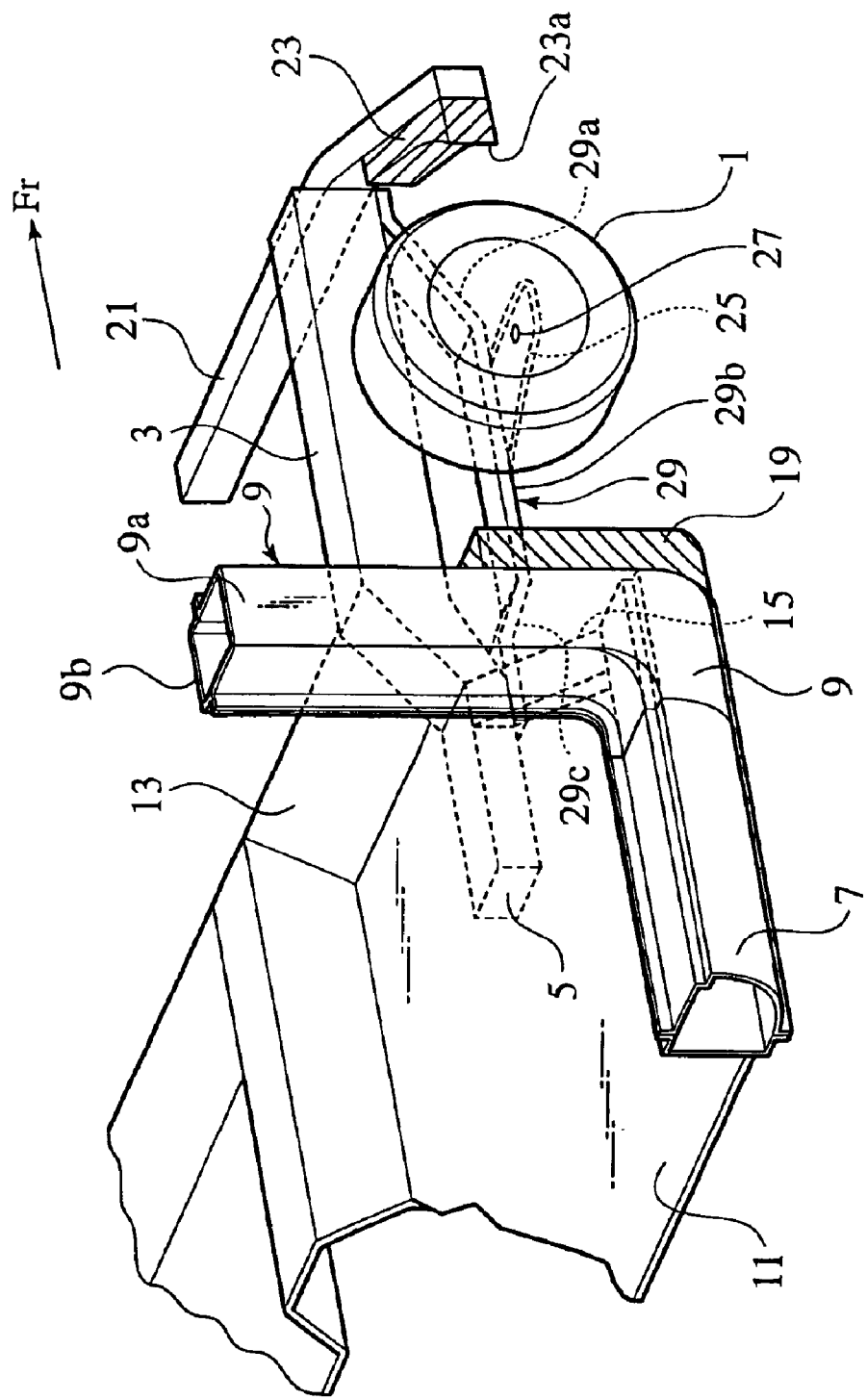
FIG. 2 is a perspective view of the front structure of FIG. 1.
Figure 3:
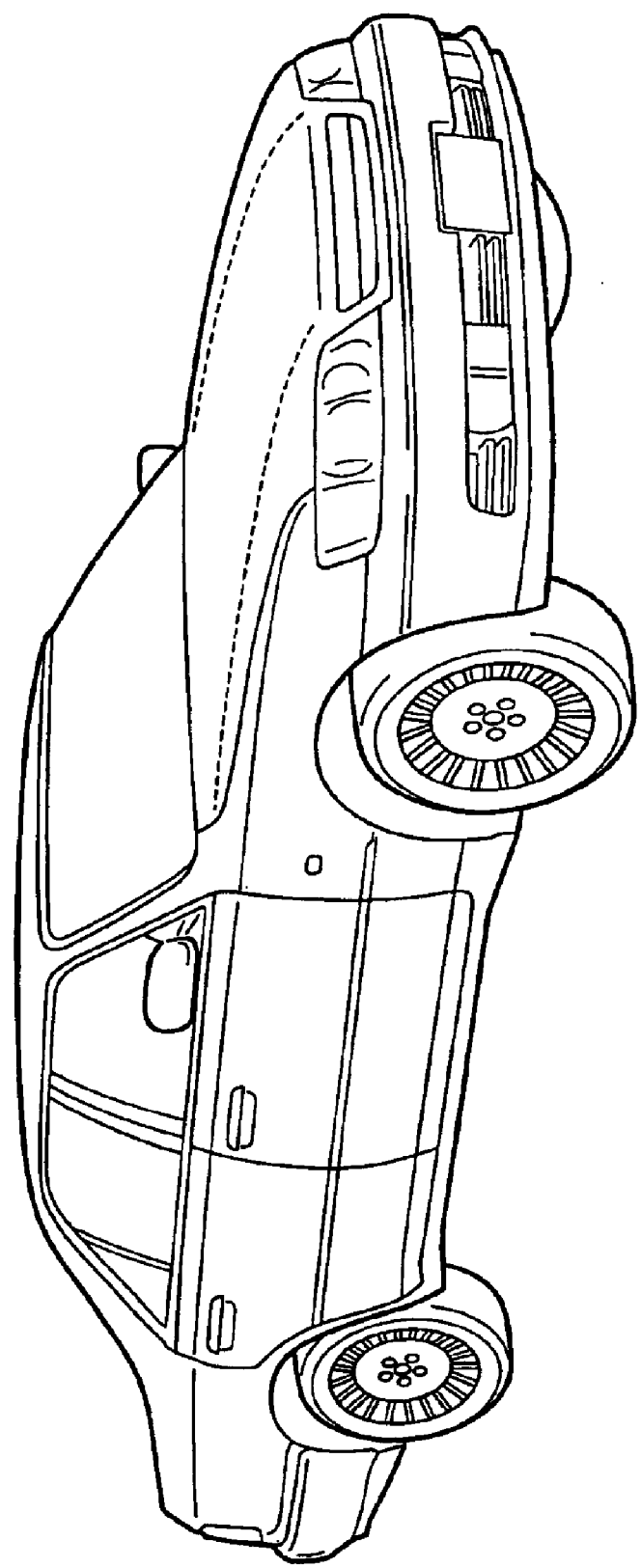
FIG. 3 is a perspective view of an automobile equipped with the front structure of FIG. 1.

In the figures, FIG. 1 is a plan view of a front structure of a vehicle body in accordance with the first embodiment of the invention. FIG. 2 is a perspective view of FIG. 1, while FIG. 3 is a perspective view of an automobile equipped with the front structure of FIG. 1. In common with FIGS. 1 and 2, a direction shown with an arrow Fr designates a front side of the vehicle body. Note, FIGS. 1 and 2 only show the front structure on the right side of the vehicle body; nevertheless the front structure on the left side of the vehicle body is identical to the same on the right side of the vehicle body because of its symmetrical arrangement. Therefore, the following descriptions will be represented by an example of the front structure on the right side of the vehicle body.

Inside a front wheel 1 in the vehicle width direction, there is a front side member 3 (as the vehicle-body structural member) extending in the fore-and-aft direction of the vehicle body. The front side member 3 has its rear end joined to an extension 5 of the front side member 3, which will be referred—front side member extension 5—, hereinafter. Behind the front wheel 1, a side sill 7 (as the vehicle-body structural member) is arranged to extend in the fore-and-aft direction of the vehicle body. On the top of a front end of the side sill 7, a front pillar 9 stands so as to cover the front end of the side sill 7.

A floor panel 11 is arranged inside the side sill 7. A dash panel 13 is arranged on a front end of the floor panel 11. The dash panel 13 is also provided, at a lower end thereof, with a dash-lower cross member 17. The above front side member extension 5 is welded to an under face of the floor panel 11, passing around a lower part of the dash-lower cross member 17. As shown in FIG. 1, the front side member extension 5 is connected to the front end of the side sill 7 through an outrigger 15.

In the embodiment, the above front side member 3, the front side member extension 5, the side sill 7, the outrigger 15 and the dash-lower cross member 17 correspond to "vehicle-body" structural members that form a framework for the vehicle body.

On the side of the side sill 7, the outrigger 15 has one end closer to the vehicle's rear than the outrigger's other end on the side of the front side member extension 5, providing a slanted face 15a (guide part) which is inclined toward the vehicle's rear as shifting outward in the vehicle width direction. The front end of the side sill 7 is shaped with an outside face (in the vehicle width direction) projecting toward the vehicle's front, providing a projecting part (projecting portion) 7a. Therefore, the front end of the side sill 7 is provided with a slanted face 7b which is inclined toward the vehicle's rear as shifting inwardly in the vehicle width direction. In the vehicle width direction, the outside face of the projecting part 7a is positioned outside the outer face of the front wheel 1 when traveling straight.

A rear energy absorbing member 19 of hard urethane foam is fitted to a recess 18 defined by the slanted face 15a of the outrigger 15 and the slanted face 7b of the side sill 7.

A bumper 21 (one of the "vehicle body" structural members) is attached to the front end of the front side member 3. A front energy absorbing member 23 of hard urethane foam is fitted to the rear face of the bumper 21, at its outer end in the vehicle width direction. As similar to the rear energy absorbing member 19, the outside face (in the vehicle width direction) of the front energy absorbing member 23 is positioned outside the outer face of the front wheel 1 when traveling straight. The front energy absorbing member 23 is shaped with an outside face (in the vehicle width direction) projecting toward the vehicle's rear, providing a projecting part 23a for covering the outer part of the front wheel 1.

In the embodiment, all of the slanted face 15a, the outrigger 15, the slanted face 7b of the side sill 7 and the front/rear energy absorbing members 19, 23 form a front-wheels' traverse controller of the invention. A subframe 29 is fitted on both under faces of the front side member 3 and the front side member extension 5. The subframe 29 is provided with a suspension arm 25 linked to the front wheel 1 at a joint 27. Between the under face of the front side member 3 and the under face of the dash-lower cross member 17, the subframe 29 is provided with the bending parts (see FIG. 8A).

The front end of the subframe 29 is fastened to the under face of the front side member 3 at a front fastening part 31, while the rear end of the subframe 29 is fastened to the under face of the front side member extension 5 at a rear fastening part 33. The subframe 29 is provided, on its corner at the rear fastening part 33, with a brace member 35.

The subframe 29 includes a front slanted part 29a inclining from the front fastening part 31 toward the vehicle's rear downward, a horizontal part 29b extending from the rear end of the part 29a toward the vehicle's rear horizontally and a rear slanted part 29c inclining from the rear end of the part 29b toward the rear fastening part 33 somewhat upward. The suspension arm 25 is connected to the horizontal part 29b.

Figure 4:
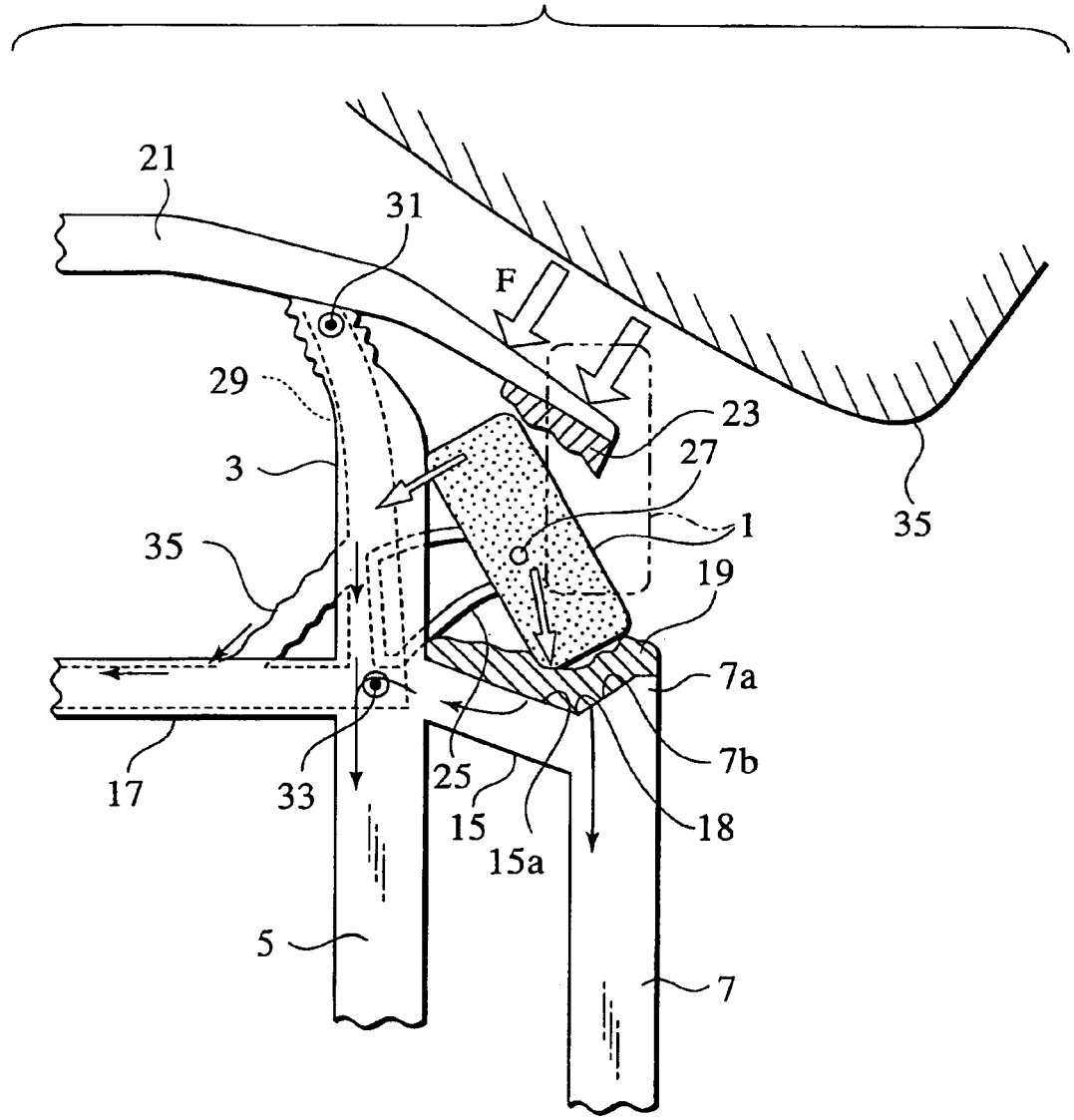
FIG. 4 is a plan view showing the deformation of a vehicle body having the front structure of FIG. 1, at the vehicle collision from its oblique forward on the right side.

The above-mentioned front structure operates as follows. FIG. 4 shows a situation where an automobile having the above front structure has a front collision with an opponent vehicle 35 obliquely from front on the right side. Then, an oblique load F is applied on the front face of the bumper 21 on its right side. FIG. 5 illustrates the sequential traverse of the front wheel 1 and the sequential deformation of respective vehicle parts, with partial diagrams (a) to (f).

First, when the load F is applied to the bumper 21 obliquely from front on the right side, the right end of the bumper 21 begins to be deformed with internal folding, as shown in the partial diagram (a). With this internal folding, the front energy absorbing member 23 on the back of the bumper 21 interferes with the front-and-right part of the wheel 1. Successively, the front energy absorbing member 23 is deformed to produce a load $F_1$ allowing the wheel 1 to retreat and another load $F_2$ allowing the wheel 1 to be steered (deformed) inwardly.

Then, the front energy absorbing member 23 operates to moderate an impact at the interference of the bumper 21 with the front wheel 1, thereby preventing the bumper 21 from being folded locally. Additionally, since the deformation of the member 23 allows its contact area with the wheel 1 to be increased, it is possible to improve an efficiency to transmit the load from the bumper 21 to the front wheel 1, permitting the reliable control in the traverse of the front wheel 1 to steer inwardly.

Further, since the front energy absorbing member 23 includes the projecting part 23a covering the front wheel 1 and also the outside face (in the vehicle's width direction) positioned outside the outer face of the front wheel 1, the member 23 guides the front wheel 1 so as to steer inwardly, ensuring the wheel's traverse control.

Next, as shown with the diagram (b) of FIG. 5, the front wheel 1 interferes with the side wall of the front side member 3 due to the inwardly steering of the front wheel 1, so that a lateral load is applied on the front side member 3.

Simultaneously with the situation shown with the diagram (b), the deformation of the vehicle body progresses with the application of an oblique load from the opponent vehicle 35 to the front ends of the front side member 23 and the subframe 29. Consequently, as shown with two-dot chain lines in the diagram (d) in side view, the subframe 29 is folded downward. Simultaneously, due to the additional application of the lateral load, the subframe 29 is further deformed inwardly (left side of FIG. 5) together with energy absorption by the deformation of the brace member 35.

As a result of the above traverse of the subframe 29, the suspension arm 25 is shifted inwardly while moving backward. Then, the front wheel 1 is of the same traverse. Thereafter, due to an additional load applied on the inward-steered front wheel 1, it further moves backward to interfere with the rear energy absorbing member 19 mounted on both front ends of the side sill 7 and the outrigger 15, as shown in the diagram (f). Owing to this deformation of the rear energy absorbing member 19, it is possible to effect the energy absorption at the vehicle front collision.

Subsequently, when the deformation of the vehicle body progresses together with the deformation of the rear energy absorbing member 19, the rear end of the front wheel 1 is guided, at its inside corner, into the recess 18 defined by the slanted face 7b of the side sill 7 and the slanted face 15a of the outrigger 15, so that the front wheel 1 has a steering posture shown in FIG. 4.

Again, the outside face of the projecting part 7a of the side sill 7 is positioned outside the outer face of the front wheel 1 in the vehicle's width direction. Thus, when the front wheel 1 moves back at the vehicle front collision, it is possible to prevent the front wheel 1 from being forced out of the side sill 7 and also possible to transmit the collision load to the front side member 3 and the side sill 7 certainly.

As mentioned above, owing to the accomplishment of the situation (a), it is possible to control the traverse of the front wheel 1 in the steering direction before the rear end of the front wheel 1 comes in contact with the rear energy absorbing member 19, thereby allowing the rear end of the front wheel 1 to be guided by the recess 18 with ease.

Further, owing to the accomplishment of the situation (b), since the front wheel 1 interferes with the front side member 3 at a designated position before the member 3 is folded inwardly and greatly, it is possible to ensure a route to transmit a load from the front wheel 1 to the front side member 3.

Additionally, owing to the accomplishment of the situations (c) and (d), the front wheel 1 is displaced backward by both of the downward-folding of the subframe 19 and the front input while maintaining a substantial constant steering angle as a result of that the front wheel 1 has its left-and-front end guided by the sidewall of the front side member 3.

Subsequently, owing to the accomplishment of the situation (f), the position (in the vehicle's width direction) of the front wheel 1 is controlled by the guidance of the recess 18 at its substantial center while the impact energy at the vehicle front collision is absorbed by the rear energy absorbing member 19. Consequently, it is possible to transmit the collision load on the front wheel 1 to the outrigger 15 and the side sill 7 certainly.

As to the whole effect brought by the above-mentioned traverse of the front wheel 1, the load applied on the vehicle obliquely from front can be received by the front wheel 1 from the beginning of the collision and furthermore, it is possible to efficiently transmit the load from the front wheel 1 to the vehicle-body structural members forming a body framework, for example, the front side member 3, the side sill 7, the outrigger 15, etc. Consequently, without greatly deforming elements forming a vehicle cabin space, such as the front pillar 9 and the side sill 7, it is possible to perform the energy absorption at the vehicle front collision efficiently.

Figure 6A:
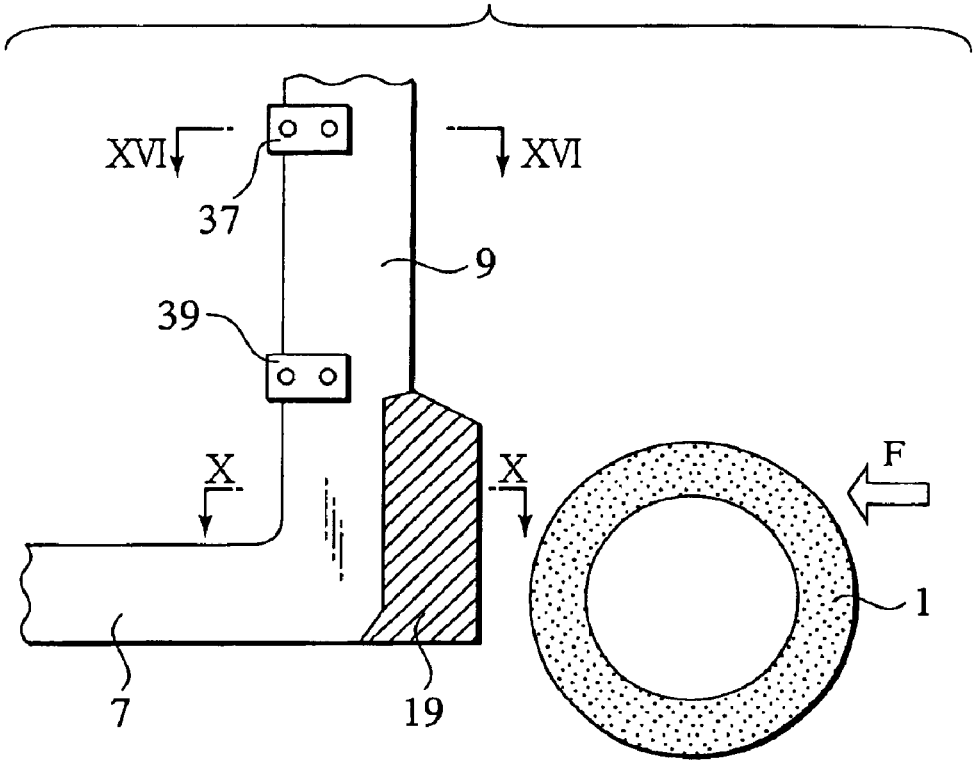
Figure 6B:
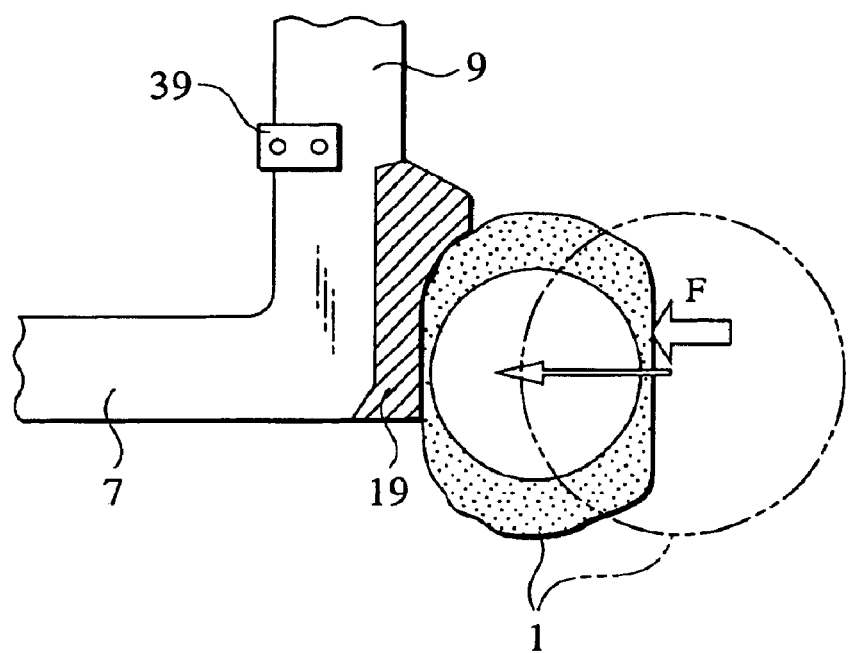

FIGS. 6A and 6B illustrate the situations at the vehicle collision in side view. As shown in FIG. 6A, when an oblique load F is applied on the front wheel 1 from the vehicle's front, the front wheel 1 moves back with the above-mentioned steering movement, so that the wheel 1 interferes with the rear energy absorbing member 19 with the deformation of a rubber part of the wheel 1, as shown in FIG. 6B. Owing to this deformation of the rear energy absorbing member 19, the impact energy is absorbed.

Since the collision load inputted to the front wheel 1 is transmitted to the front end of the side sill 7 and the outrigger 15 through the rear end of the wheel 1, the great deformation is not exerted on the front pillar 9 having door hinges 37, 39 attached thereto directly, thereby facilitating the opening/closing of the doors even after the collision.

Figure 7:
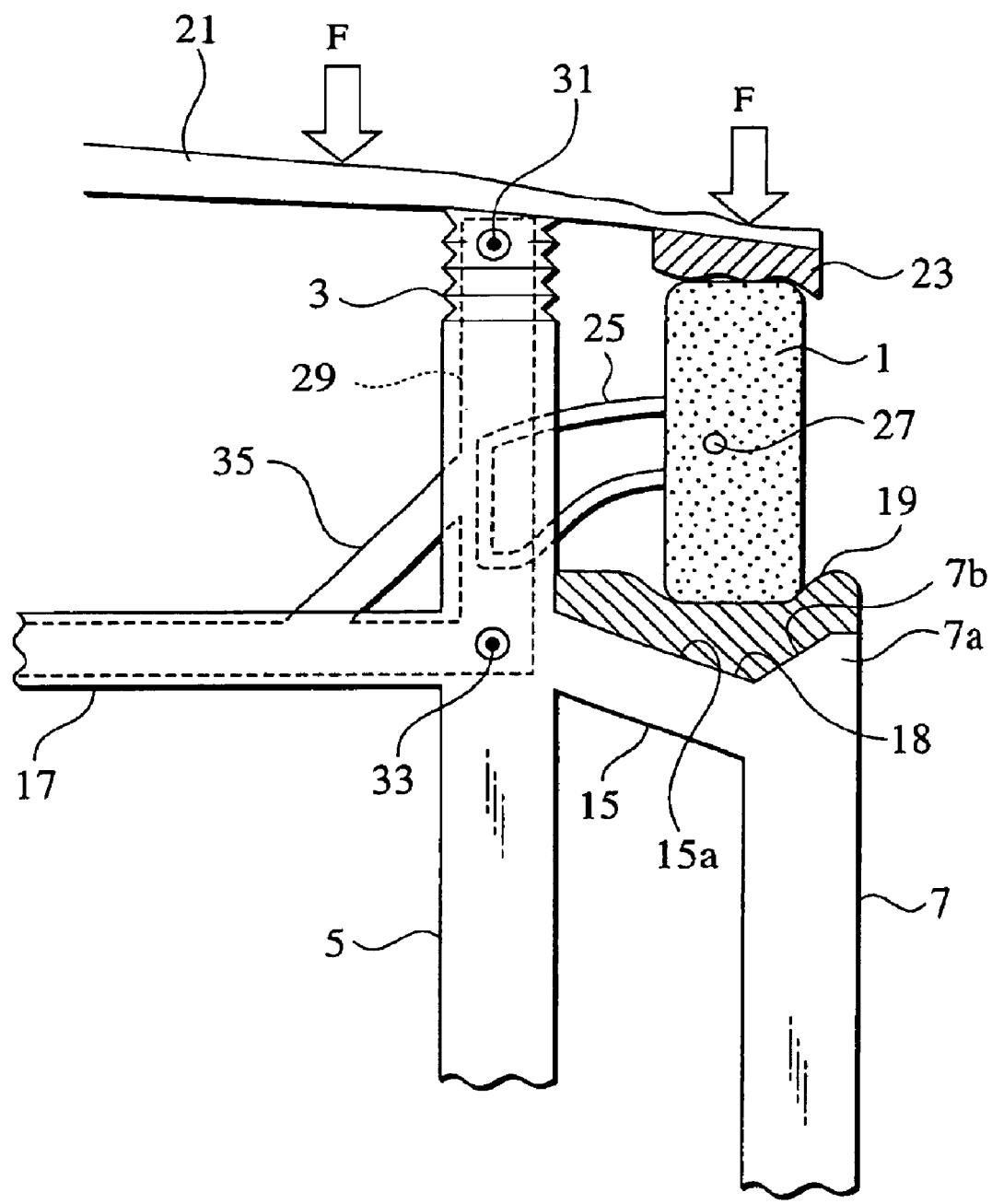
FIG. 7 is a plan view of the front structure of FIG. 1 when the vehicle collides with the other vehicle straightforwardly.
Figure 8A:
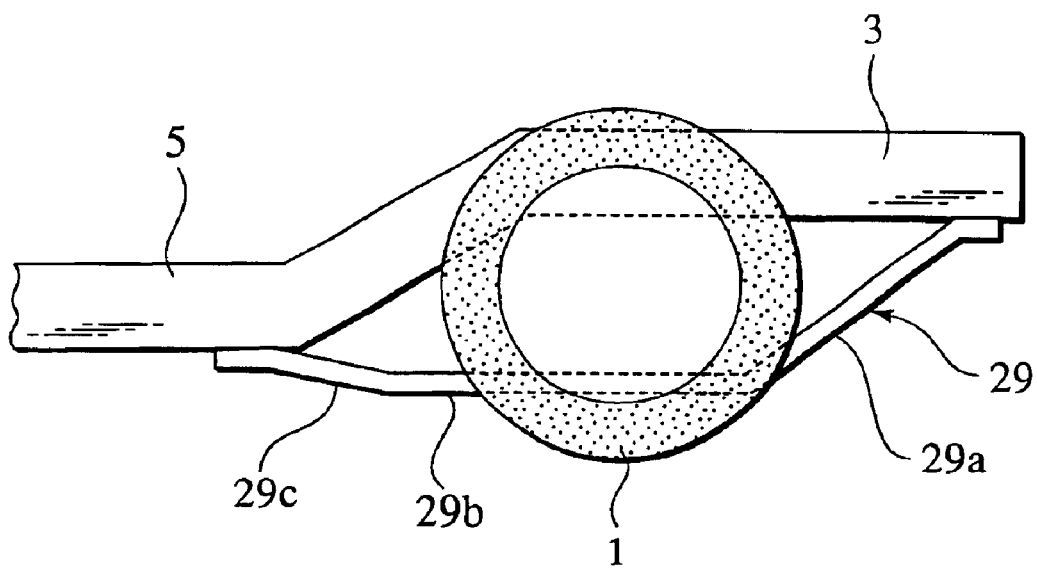
Figure 8B:
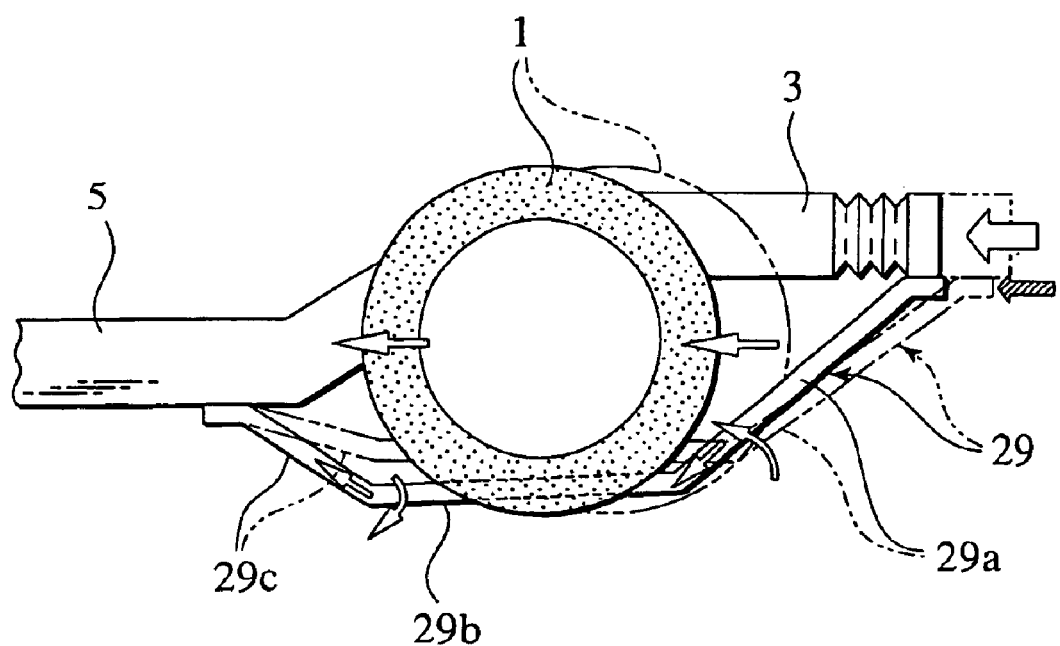

As shown in FIGS. 7, 8A and 8B, when the vehicle collides with the opponent vehicle straightforwardly, a load F in the vehicle's fore-and-aft direction is exerted throughout the whole bumper 21. Therefore, the front side member 3 and the subframe 29 are subjected to a collision load in the vehicle's fore-and-aft direction from the beginning of collision.

Consequently, as shown in FIGS. 7 and 8B, the bumper 21 is compressively deformed as a whole and simultaneously, the front side member 3 is axially deformed in compression and the subframe 29 is folded downward. Then, the front energy absorbing member 23 on the bumper 21 interferes with the front part of the front wheel 1 to start the deformation of the rubber part of the front wheel 1 and its retreat. Further, with the progress in the retreat of the front wheel 1, the rear end of the front wheel 1 interferes with the rear energy absorbing member 19 arranged on the side sill 7 and the outrigger 15. In this way, owing to the deformation of the rear energy absorbing member 19, it is possible to increase an amount of energy to be absorbed.

According to this embodiment, the outside face (in the vehicle's width direction) of the projecting part 7a at the front end of the side sill 7 is positioned outside the front wheel 1. Therefore, when the retreat of the front wheel 1 at the vehicle front collision causes the rear energy absorbing member 19 to be deformed, the wheel's traverse is controlled by the projecting part 7a thereby to prevent the side sill 7 from projecting outward.

That is, according to the embodiment, even when the vehicle collides with the opponent vehicle 35 not only obliquely but also straightforwardly so that the front wheel 1 retreats simply, the front wheel 1 is guided by the recess 18 formed by the projecting part 7a of the side sill 7 and the outrigger 15. Consequently, the front end of the front wheel 1 interferes with the front side member 3, while the rear end of the wheel 1 interferes with the front end of the side sill 7 and the outrigger 15 through the rear energy absorbing member 19, whereby the collision load from the front wheel 1 can be dispersed to the vehicle-body structural members forming the framework for vehicle-body, efficiently.

Figure 9:
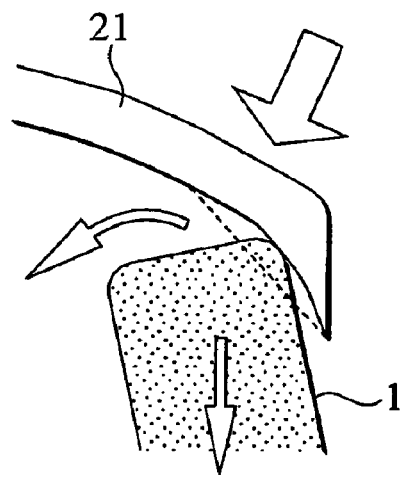
FIG. 9 is a plan view showing an arrangement where a front energy-absorbing member in the embodiment of FIG. 1 is abolished, at the vehicle collision.

In place of the projecting part 23a, the front energy absorbing member 23 may be formed so that its rear surface inclines toward the vehicle's rear side as shifting outward in the vehicle's width direction. Alternatively, instead of the inclined rear face of the member 23, the bumper 21 may be formed with a rear surface facing the front wheel 1, which is inclined in the above manner. In a further modification, as shown in FIG. 9, the bumper 21 may be formed so that its end projects toward the vehicle's rear thereby to cover the front wheel 1.

In the above-mentioned embodiment, all of the lateral end (in the vehicle's width direction) of the bumper 21, the front energy absorbing member 23, the recess 18 in front of the side sill 7 and the outrigger 15, and the rear energy absorbing member 19 form a front-wheel traverse controller which controls the traverse of the front wheel 1 and further transmits the collision load from the front wheel 1 to the vehicle-body structural members when the vehicle has a front collision.

Figure 10A:
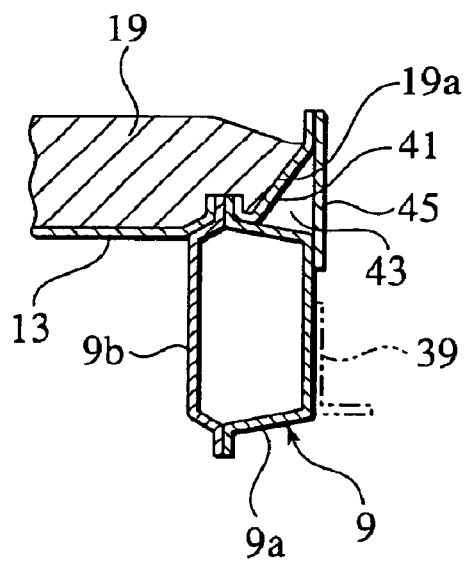
Figure 10B:
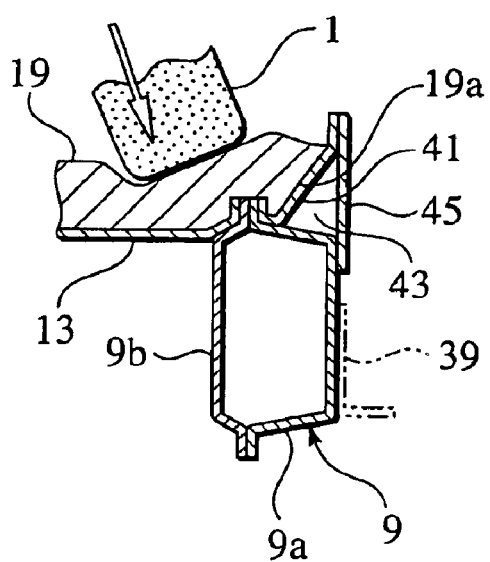

FIGS. 10A and 10B illustrate the second embodiment of the present invention. According to this embodiment, there is provided, at a position of the section X—X of the front pillar 9 of FIG. 6, a plate member 41 (as external reinforcing member) between a "front pillar" lower-and-outer member 9a and the rear energy absorbing member 19. In the figures, reference numeral 9b denotes a "front pillar" lower-and-inner member.

Corresponding to the front pillar 9, the rear energy absorbing member 19 is shaped so as to have a notch face 19a allowing a triangular space 43 to be defined between the member 19 and the "front pillar" lower-and-outer member 9a. The above plate member 41 is arranged so as to cover the notch face 19a. The plate member 41 has one end welded to the "front pillar" lower-and-outer member 9a at its connection with the "front pillar" lower-and-inner member 9b and also has the other end welded to an inner face of a panel member 45.

Therefore, according to the second embodiment, even when the front collision load is applied to the rear energy absorbing member 19 through the front wheel 1, the deformation on so-called "body's side part" (e.g. the "front pillar" lower-and-outer member 9a forming a cabin space) can be reduced by the plate member 41, whereby it is possible to ensure the deformation-prevention of the door hinges 39, 37.

Figure 11A:
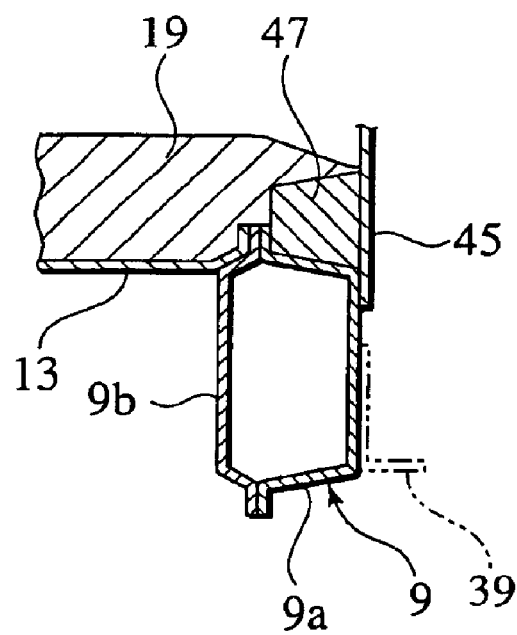
Figure 11B:
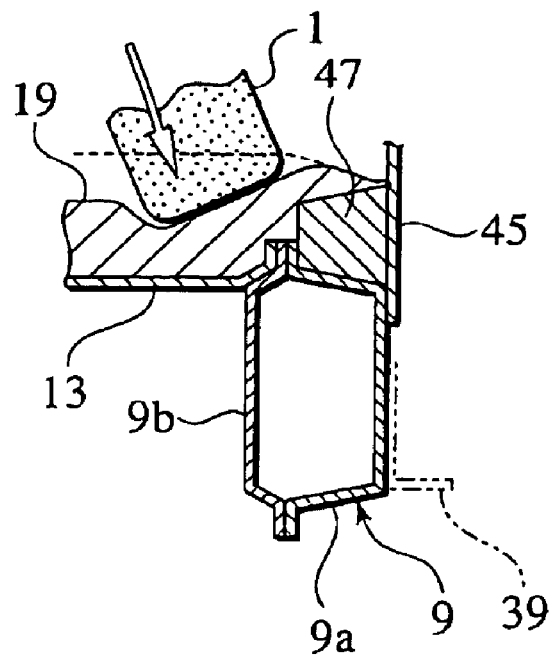

FIGS. 11A and 11B show the third embodiment of the invention. According to the embodiment, the triangular space 43 of the second embodiment is replaced with a rectangular space which is filled up with a filling member 47 made of resin or light metals. Then, in addition to the similar effects of the second embodiment, it is possible to efficiently reinforce the front body structure since the filling member 47 can be accommodated in the rectangular space with ease.

Figure 12A:
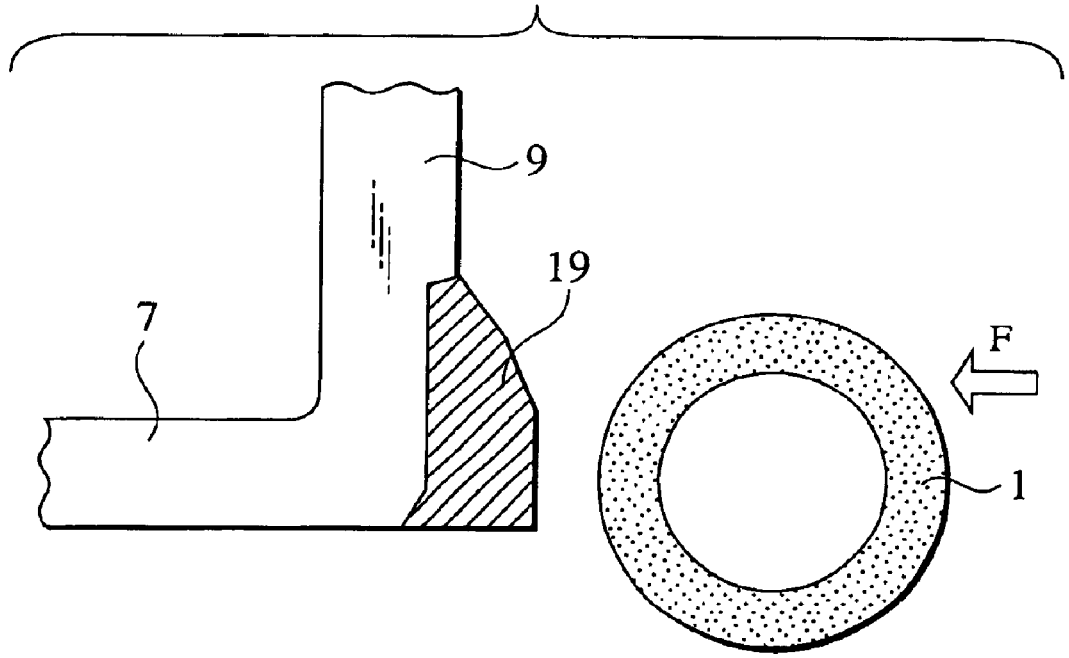
Figure 12B:
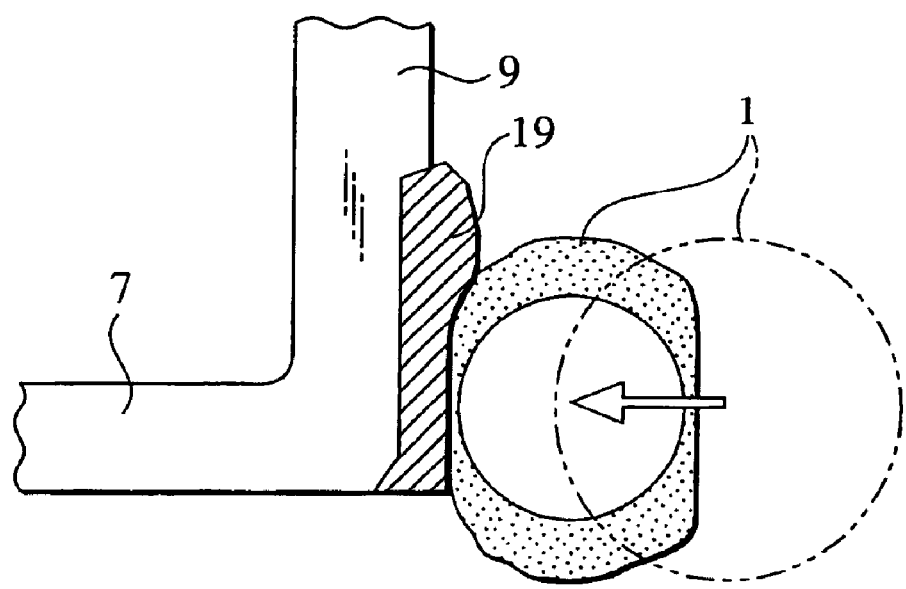

FIGS. 12A and 12B show the fourth embodiment of the invention. According to the embodiment, the rear energy absorbing member 19 in front of the side sill 7 is formed in such a manner that the same member's thickness in the vehicle's fore-and-aft direction gradually increases as directing from the member's upper part corresponding to the front pillar 9 to the member's lower part corresponding to the side sill 7.

As shown in FIG. 12B, at the vehicle front collision, the rear energy absorbing member 19 is apt to be deformed mainly at the member's lower part corresponding to the side sill 7. Therefore, by increasing the thickness of the member's lower part, the collision load on the front wheel 1 can be transmitted as an axial force to the side sill 7 mainly, whereby it is possible to reduce a load on the front pillar 9 and also a bending moment generating in the base of the front pillar 9.

Figure 13A:
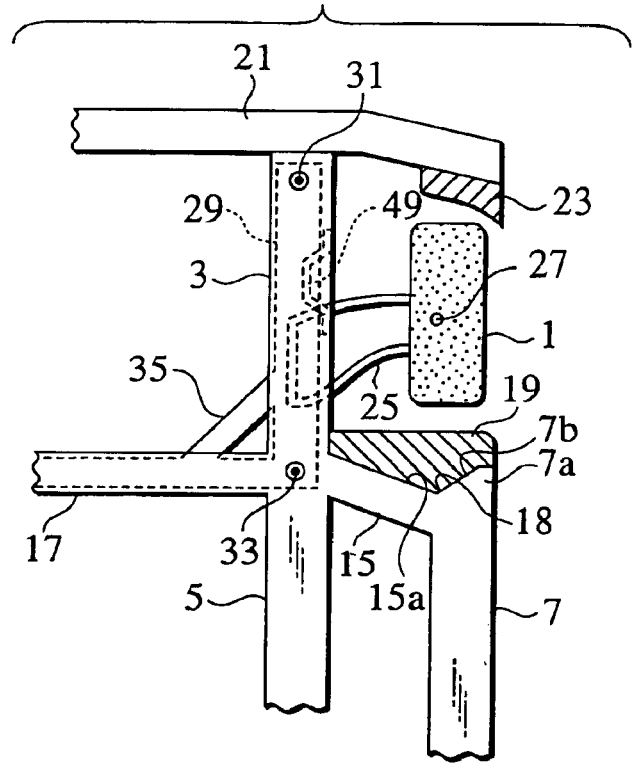
Figure 13B:
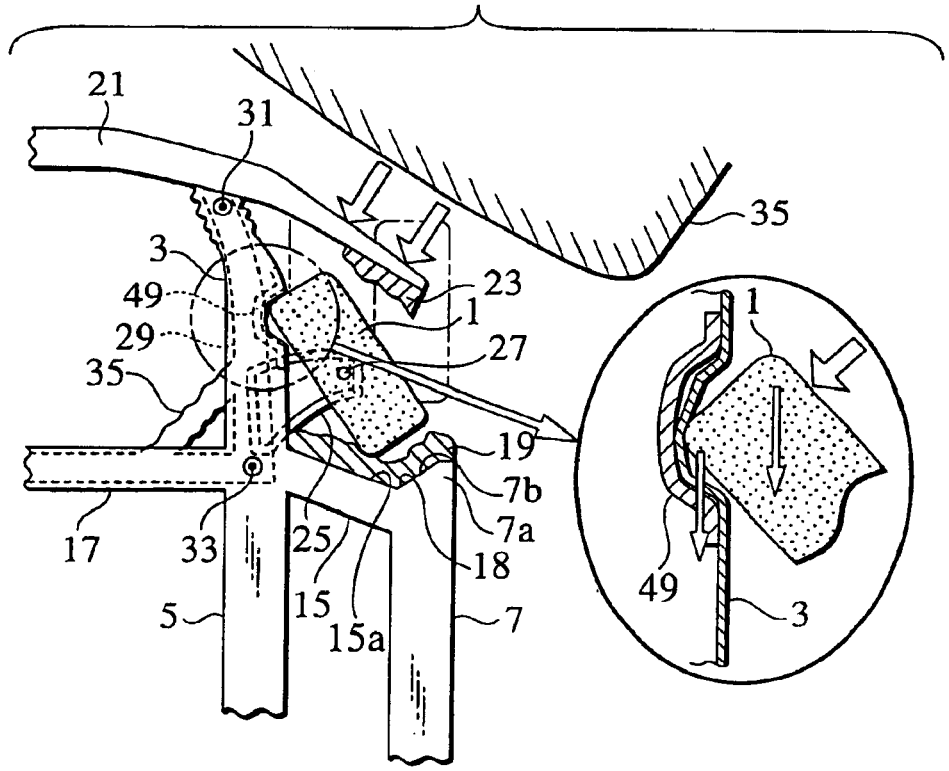

FIGS. 13A and 13B show the fifth embodiment of the present invention. According to the embodiment, the "hollow" front side member 3 is provided with a recessed reinforcement 49 for acceptance of the front part of the front wheel 1 being deformed at the vehicle front collision. The reinforcement 49 is fitted on an inside face of the member's outside portion in the vehicle's width direction. Consequently, at the collision, the front wheel 1 interferes with the recessed reinforcement 49 after the sidewall of the front side member 3 has been deformed by the front-and-left corner of the front wheel 1, as shown in FIG. 13B. Thus, the collision load applied on the front wheel 1 can be converted into a force on the front side member 3 in the fore-and-aft direction through the reinforcement 49, whereby it is possible to improve an efficiency to transmit a load to the vehicle-body structural members forming the framework of vehicle body.

Figure 14:
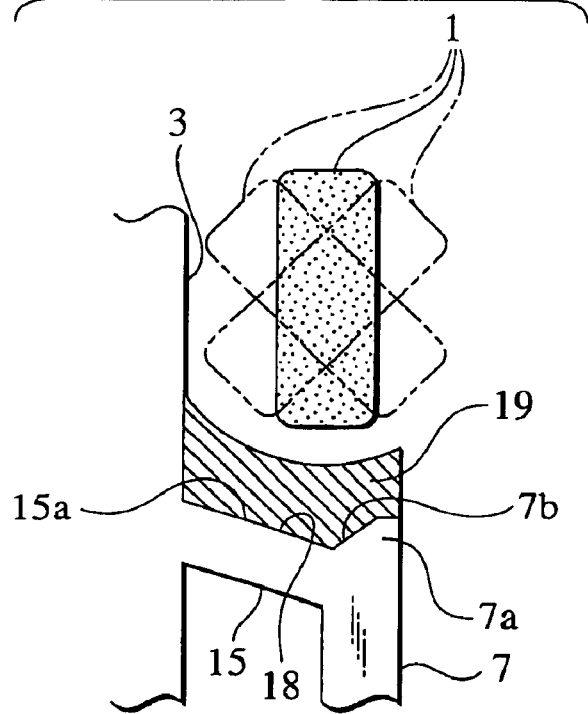
FIG. 14 is a plan view of an essential part of the structure in accordance with the sixth embodiment.

FIG. 14 shows the sixth embodiment of the present invention. According to the embodiment, the rear energy absorbing member 19 has its side facing the front wheel 1, formed so as to correspond to a steering locus (tracks of traverse) of the front wheel 1 moving at the vehicle front collision. In other words, corresponding to the profile of the recess 18 defined by the slanted face 7b of the side sill 7 and the slanted face 15a of the outrigger 15, the rear energy absorbing member 19 is shaped so as to have a generally-uniform thickness in the vehicle fore-and-aft direction.

Owing to the formation of the rear energy absorbing member 19, even if the steering angle of the front wheel 1 at the vehicle front collision varies slightly, it is possible to ensure the energy absorption of collision load exerted to the front wheel 1 sufficiently.

Figure 15:
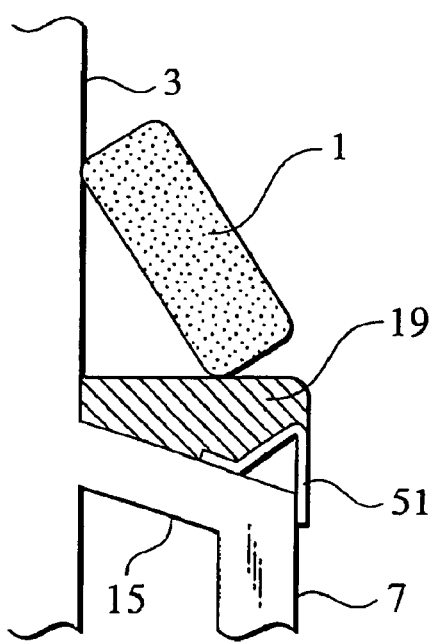
FIG. 15 is a plan view of an essential part of the structure in accordance with the seventh embodiment.

FIG. 15 shows the seventh embodiment of the present invention. According to the embodiment, a projecting member 51 in place of the above projecting part 7a is fitted to the front end of the side sill 7. Owing to the provision of the member 51 different from the side sill 7, by altering the member 51 to another member so as to accord with the modifications in both vehicle sorts and the front wheel's shape appropriately, it is possible to prevent the front wheel 1 from projecting outward in the vehicle's width direction while treating in contact with the front end of the side sill 7, without altering the frame structure for vehicle body greatly.

Figure 16A:
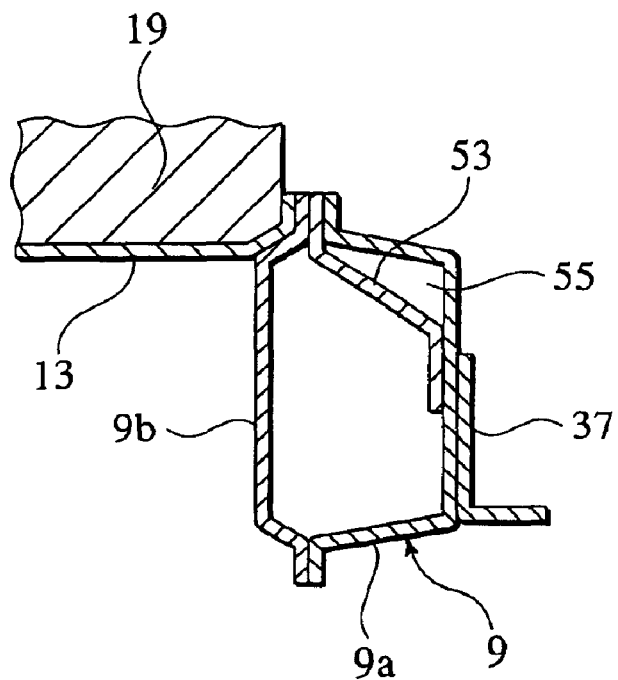
Figure 16B:
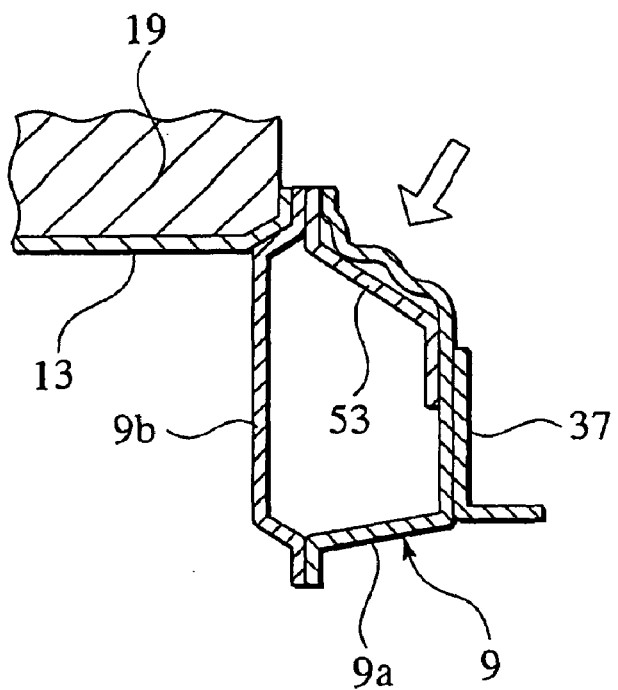

FIGS. 16A and 16B show the eighth embodiment of the present invention. According to the embodiment, the "hollow" front pillar 9 is provided, at a position of the section XVI—XVI of the front pillar 9 of FIG. 6A, with a plate member 53 as an internal reinforcement. The plate member 53 has one end welded to the inner face of the "front pillar" lower-and-outer member 9a and the other end welded to a joint between the member 9a and the "front pillar" lower-and-inner member 9b, thereby forming a space 55 between the front part of the member 9a and the plate member 53.

In this way, as shown in FIG. 16B, since the space 55 operates to absorb the front collision load, it is possible to prevent the deformation of the front pillar 9 in the vicinity of the door hinge 37.

Japanese patent application No. 2001-52736 is expressly incorporated herein by reference.

The scope of the invention is defined with reference to the following claims.

Industrial Applicability

A front body structure is provided to restrain a collision load, which has been applied on a front wheel by a vehicle front collision, to be concentrated on a front end of a side sill excessively. This front body structure is capable of avoiding a concentration of a collision load, which has been exerted to a front wheel (or front wheels) by the vehicle front collision, on the front end of the side sill.

What is claimed is:

1. A front body structure for vehicle, comprising;
   a front wheel arranged in each side of the vehicle;
   vehicle-body structural members comprising a side sill arranged behind the front wheel in the vehicle's fore-and-aft direction and a side member inside the front wheels in a vehicle's width direction, the side member including an energy absorbing section which absorbs a collision energy and an energy un-absorbing section which does not absorb a collision energy; and
   a front-wheel traverse controller provided on the vehicle-body structural members, comprising an outside projecting portion projecting forwardly from a front end of the side sill in the vehicle's fore-and-aft direction, for controlling the traverse of the front wheel at a vehicle front collision to transmit a collision load from a front end of the front wheel to a side face of the energy un-absorbing section of the side member and to transmit a collision load from a rear end of the front wheel to a front end of the side sill.

2. The front body structure of claim 1, wherein the front-wheel traverse controller includes an energy absorbing member which is deformable on absorption of the collision load.

3. The front body structure of claim 2, wherein the energy absorbing member has a front profile formed so as to follow tracks of traverse of the front wheel at the vehicle front collision.

4. The front body structure of claim 1, wherein
the front-wheel traverse controller includes a guide part for shifting the front wheel inwardly in the vehicle's width direction at the vehicle front collision.

5. The front body structure of claim 1, wherein the outside projecting portion is formed by a member different from the side sill.

6. The front body structure of claim 1, wherein
the vehicle-body structural members comprise a front side member having its rear end connected to a front side member extension, and
the front side member extension is connected to a front end of the side sill through an outrigger,
whereby the front-wheel traverse controller transmits the collision load from the front wheel to the side sill and the outrigger.

7. The front body structure of claim 1, wherein
the front-wheel traverse controller comprises an inside part of a bumper in front of the front wheel, and
the inside part of the bumper has its face opposing to the front wheel, which is shaped so as to cover the front wheel.

8. The front body structure of claim 1, further comprising a subframe connected to the front wheel through a suspension arm,
whereby, at the vehicle front collision, the subframe is folded downward and also deformed inwardly in the vehicle's width direction thereby allowing the front wheel to be deformed inwardly in the vehicle's width direction and backward.

9. A front body structure for vehicle, comprising:
a front wheel arranged in each side of the vehicle;
vehicle-body structural members arranged at least behind the front wheel in a vehicle's fore-and-aft direction and inside the front wheels in a vehicle's width direction; and
a front-wheel traverse controller provided on the vehicle-body structural members, for controlling the traverse of the front wheel at a vehicle front collision and transmitting a collision load from the front wheel to the vehicle-body structural members,
wherein the vehicle-body structural members comprise a side sill arranged behind the front wheel in the vehicle's fore-and-aft direction,
the front-wheel traverse controller comprises an outside projecting portion projecting forwardly from a front end of the side sill in the vehicle's fore-and-aft direction,
the vehicle-body structural members comprise a front side member having its rear end connected to a front side member extension,
the front side member extension is connected to a front end of the side sill through an outrigger, and
the front-wheel traverse controller includes a recessed guide part arranged on both a front end of the side sill and the outrigger thereby to move the front wheel inwardly in the vehicle's width direction,
wherein the side sill is arranged so that its outer face in the vehicle's width direction is outside an outer face of the front wheel in the vehicle's width direction.

10. A front body structure for vehicle, comprising:
a front wheel arranged in each side of the vehicle;
vehicle-body structural members arranged at least behind the front wheel in a vehicle's fore-and-aft direction and inside the front wheels in a vehicle's width direction;
a front-wheel traverse controller provided on the vehicle-body structural member, for controlling the traverse of the front wheel at a vehicle front collision and transmitting a collision load from the front, wheel to the vehicle-body structural member; and
a front pillar arranged on the vehicle-body structural members behind the front wheel,
wherein the vehicle-body structural member comprises a side sill arranged behind the front wheel in the vehicle's fore-and-aft direction,
the front-wheel traverse controller comprises an outside projecting portion projecting forwardly from a front end of the side sill in the vehicle's fore-and-aft direction and an energy absorbing member which is deformable on absorption of the collision load,
the energy absorbing member is arranged so as to extend from a front end of the side sill till a front face of the front pillar, and
an outer reinforcement member is arranged between the front pillar and the energy absorbing member to restrain a front collision load exerted to the energy absorbing member from being transmitted to the front pillar.

11. The front body structure of claim 10, wherein the outer reinforcement member is formed by a plate member that covers an outside face of the energy absorbing member in the vehicle's width direction.

12. The front body structure of claim 10, wherein the outer reinforcement member is formed by a filling member that fills in a space defined between an outside face of the energy absorbing member in the vehicle's width direction and the front pillar.

13. The front body structure of claim 12, wherein the filling member is formed by resin or light metals.

14. A front body structure for vehicle, comprising:
a front wheel arranged in each side of the vehicle;
vehicle-body structural members arranged at least behind the front wheel in a vehicle's fore-and-aft direction and inside the front wheels in a vehicle's width direction; and
a front-wheel traverse controller provided on the vehicle-body structural members, for controlling the traverse of the front wheel at a vehicle front collision and transmitting a collision load from the front wheel to the vehicle-body structural members;
wherein the vehicle-body structural members comprise a side sill arranged behind the front wheel in the vehicle's fore-and-aft direction,
the front-wheel traverse controller comprises an outside projecting portion projecting forwardly from a front end of the side sill in the vehicle's fore-and-aft direction, and
the vehicle-body structural members comprise a front side member which has an outside part in the vehicle's width direction provided, on an inside surface thereof, with a recessed reinforcement for acceptance of a front part of the front wheel deformed at the vehicle front collision.

15. A front body structure for vehicle, comprising;
a front wheel arranged in each side of the vehicle;
vehicle-body structural members arranged at least behind the front wheel in a vehicle's fore-and-aft direction and inside the front wheels in a vehicle's width direction; and
a front-wheel traverse controller provided on the vehicle-body structural member, for controlling the traverse of the front wheel at a vehicle front collision and transmitting a collision load from the front wheel to the vehicle-body structural member,
wherein the vehicle-body structural member comprises a side sill arranged behind the front wheel in the vehicle's fore-and-aft direction,
the front-wheel traverse controller comprises an outside projecting portion projecting forwardly from a front end of the side sill in the vehicle's fore-and-aft direction and an energy absorbing member which is deformable on absorption of the collision load,
the energy absorbing member is arranged so as to extend from a front end of the side sill up to a front face of a front pillar, and
the energy absorbing member is shaped so that its part corresponding to the front end of the side sill has a thickness in the vehicle's fore-and-aft direction larger than a thickness of the energy absorbing member's part corresponding to the front face of the front pillar in the vehicle's fore-and-aft direction.

16. The front body structure of claim 15, wherein
the energy absorbing member is shaped to have a thickness in the vehicle's fore-and-aft direction to be gradually increased from the energy absorbing member's part corresponding to the front face of the front pillar till the part corresponding to the front end of the side sill.

17. A front body structure for vehicle, comprising:
a front wheel arranged in each side of the vehicle;
vehicle-body structural members arranged at least behind the front wheel in a vehicle's fore-and-aft direction and inside the front wheels in a vehicle's width direction;
a front-wheel traverse controller provided on the vehicle-body structural members, for controlling the traverse of the front wheel at a vehicle front collision and transmitting a collision load from the front wheel to the vehicle-body structural members; and
a hollow front pillar arranged on the vehicle-body structural members behind the front wheel,
wherein the vehicle-body structural members comprise a side sill arranged behind the front wheel in the vehicle's fore-and-aft direction,
the front-wheel traverse controller comprises an outside projecting portion projection forwardly from a front end of the side sill in the vehicle's fore-and-aft direction, and
the hollow front pillar is provided, in section of a pillar's lower part, with an internal reinforcement which has one end connected to a door hinge plate fitted to a side face of the pillar's lower part of the front pillar and the other end connected to a front part of the pillar's lower part, thereby forming a space between the internal reinforcement of the front part.

18. A front body structure for vehicle, comprising;
a front wheel arranged in each side of the vehicle;
vehicle-body structural members comprising a side sill arranged behind the front wheel in the vehicle's fore-and-aft direction and a side member inside the front wheels in a vehicle's width direction, the side member including an energy absorbing section which absorbs a collision energy and an energy un-absorbing section which does not absorb a collision energy; and
front-wheel traverse controller means provided on the vehicle-body structural members, comprising an outside projecting portion projecting forwardly from a front end of the side sill in the vehicle's fore-and-aft direction, for controlling the traverse of the front wheel at a vehicle front collision to transmit a collision load from a front end of the front wheel to a side face of the energy un-absorbing section of the side member and to transmit a collision load from a rear end of the front wheel to a front end of the side sill.

19. A front body structure for vehicle, comprising;
a front wheel arranged in each side of the vehicle;
vehicle-body structural members comprising a side sill behind the front wheel in a vehicle's fore-and-aft direction and a side member inside the front wheels in a vehicle's width direction, the side member including an energy absorbing section which absorbs a collision energy and an energy un-absorbing section which does not absorb a collision energy; and
a front-wheel traverse controller provided on the vehicle-body structural members, for controlling the traverse of the front wheel at a vehicle front collision to transmit a collision load from a front end of the front wheel to a side face of the energy un-absorbing section of the side member and to transmit a collision load from a rear end of the front wheel to a front end of the side sill.

20. The front body structure of claim 19, wherein the front-wheel traverse controller includes an energy absorbing member which is deformable on absorption of the collision load.

21. The front body structure of claim 19, wherein
the front-wheel traverse controller is arranged on a front end of the side sill and includes a guide part for shifting the front wheel inwardly in the vehicle's width direction at the vehicle front collision.

22. The front body structure of claim 19, wherein
the front-wheel traverse controller comprises an outside projecting portion projecting forwardly from a front end of the side sill in the vehicle's fore-and-aft direction.

23. The front body structure of claim 19, wherein
the front-wheel traverse controller comprises an inside part of a bumper in front of the front wheel, and
the inside part of the bumper has its face opposing to the front wheel, which is shaped so as to cover the front wheel.

* * * * *